US012422784B2

(12) United States Patent
Kuo et al.

(10) Patent No.: US 12,422,784 B2
(45) Date of Patent: Sep. 23, 2025

(54) MULTI-SHOT TIME-TO-DIGITAL CONVERTER AND TIME-MEASUREMENT DEVICE

(71) Applicant: Seer Microelectronics, Inc., Hsinchu County (TW)

(72) Inventors: Ming-Ching Kuo, Hsinchu County (TW); Ming-Feng Huang, Hsinchu County (TW)

(73) Assignee: SEER MICROELECTRONICS, INC., Hsinchu County (TW)

( * ) Notice: Subject to any disclaimer, the term of this patent is extended or adjusted under 35 U.S.C. 154(b) by 182 days.

(21) Appl. No.: 18/518,517

(22) Filed: Nov. 23, 2023

(65) Prior Publication Data

US 2024/0231283 A1 Jul. 11, 2024

Related U.S. Application Data

(60) Provisional application No. 63/427,564, filed on Nov. 23, 2022.

(51) Int. Cl.
*H03M 1/50* (2006.01)
*G04F 10/00* (2006.01)

(52) U.S. Cl.
CPC .................................. *G04F 10/005* (2013.01)

(58) Field of Classification Search
CPC .................................................... G04F 10/005
USPC ........................................................ 341/166
See application file for complete search history.

(56) References Cited

U.S. PATENT DOCUMENTS

2021/0126643 A1* 4/2021 Tripodi ..................... G06F 1/08
2022/0026856 A1* 1/2022 Lee ......................... H03L 7/085

FOREIGN PATENT DOCUMENTS

CN 115242242 A 10/2022
TW I743203 B 10/2021

OTHER PUBLICATIONS

Taiwan Intellectual Property Office Office Action Search Report on Oct. 9, 2024.

* cited by examiner

*Primary Examiner* — Jean B Jeanglaude
(74) *Attorney, Agent, or Firm* — WPAT, PC

(57) ABSTRACT

The present invention relates a multi-shot time-to-digital converter and a time-measurement device. The multi-shot time-to-digital converter includes a time-to-digital conversion circuit and a timing control circuit. The timing control circuit is coupled to the time-to-digital conversion circuit and sending a start signal to the time-to-digital conversion circuit multiple times for measuring a time interval corresponding to the start signal. The time-to-digital conversion circuit obtains a fine phase time based on a plurality of clock signals to measure the time interval and provides a plurality of time-to-digital codes for digital processing. The clock signals have different phases. The time-to-digital codes are further processed to obtain the time-to-digital codes with better resolution.

12 Claims, 7 Drawing Sheets

MULTI-SHOT TIME-TO-DIGITAL CONVERTER AND TIME-MEASUREMENT DEVICE

FIELD OF THE INVENTION

The present invention relates to a time-to-digital converter, especially to a multi-shot time-to-digital converter.

BACKGROUND OF THE INVENTION

A time-to-digital converter (TDC) is a key component of time-measurement devices. The accuracy of a time-measurement device is affected by quantization error and nonlinearity of the TDC which includes multi-stage time delay cells therein. But limited by manufacturing technology, there is a mismatch among the time delay cells, resulting in differences of delay time among each of the time delay cells. This non-ideal characteristic will worsen the nonlinearity of the TDC, since the resolution of the TDC is the quantization step size, which is determined by the minimum time delay of the delay cells. However, the minimum time delay of the delay cells may be limited by technology node used for manufacturing of the delay cells, which also may limit the best resolution that the TDC may achieve.

Thus, the present invention provides a multi-shot time-to-digital converter which solves the above technical problems, improves resolution of time-to-digital conversion and reduces nonlinearity and quantization error.

SUMMARY

An objective of the present invention is to provide a multi-shot time-to-digital converter, which sends a start signal multiple times, makes the start signals roll across different fine phase times, and measures a time interval corresponding to the start signal based on a plurality of clock signals for reducing nonlinearity and quantization error and improving effective resolution of time-to-digital conversion.

The present invention provides a multi-shot time-to-digital converter, which comprises a time-to-digital conversion circuit and a timing control circuit. The timing control circuit is coupled to the time-to-digital conversion circuit and sending a start signal to the time-to-digital conversion circuit multiple times for measuring a time interval corresponding to the start signal. The time-to-digital conversion circuit obtains a fine phase time based on a plurality of clock signals to measure the time interval and provide a plurality of time-to-digital codes for digital processing. The clock signals have different phases.

The present invention provides a time-measurement device, which includes an emitting module, a sensing module, and a multi-shot time-to-digital converter. The emitting module sends a measurement signal based on a start signal and the sensing module senses the returned measurement signal and correspondingly generates a stop signal. The multi-shot time-to-digital converter is coupled to the emitting module and the sensing module, sends the start signal multiple times, and receives stop signals. Based on a plurality of clock signals, the multi-shot time-to-digital converter obtains a fine phase time to measure a time interval corresponding to the start signal and the stop signal and provide a plurality of time-to-digital codes for digital processing. The clock signals have different phases.

DETAILED DESCRIPTION

In order to learn features and functions of the present invention more clearly, please refer to the following embodiments and detailed description.

Certain terms are used in the description and claims to refer to particular elements. Those skilled in the art should understand that hardware manufacturers may use different terms to refer to the same component. The specification and claims do not use the difference in name as a way to distinguish components but use the difference in function of components as a criterion for distinguishing. "Comprise/Include" mentioned throughout the specification and claims is an open term, so it should be interpreted as "including but not limited to". In addition, the term "coupled" herein includes any direct and indirect means of connection. Therefore, if it is described that a first device is coupled to a second device, it means that the first device may be directly connected to the second device, or indirectly connected to the second device through other devices or connection means.

Figure 1:
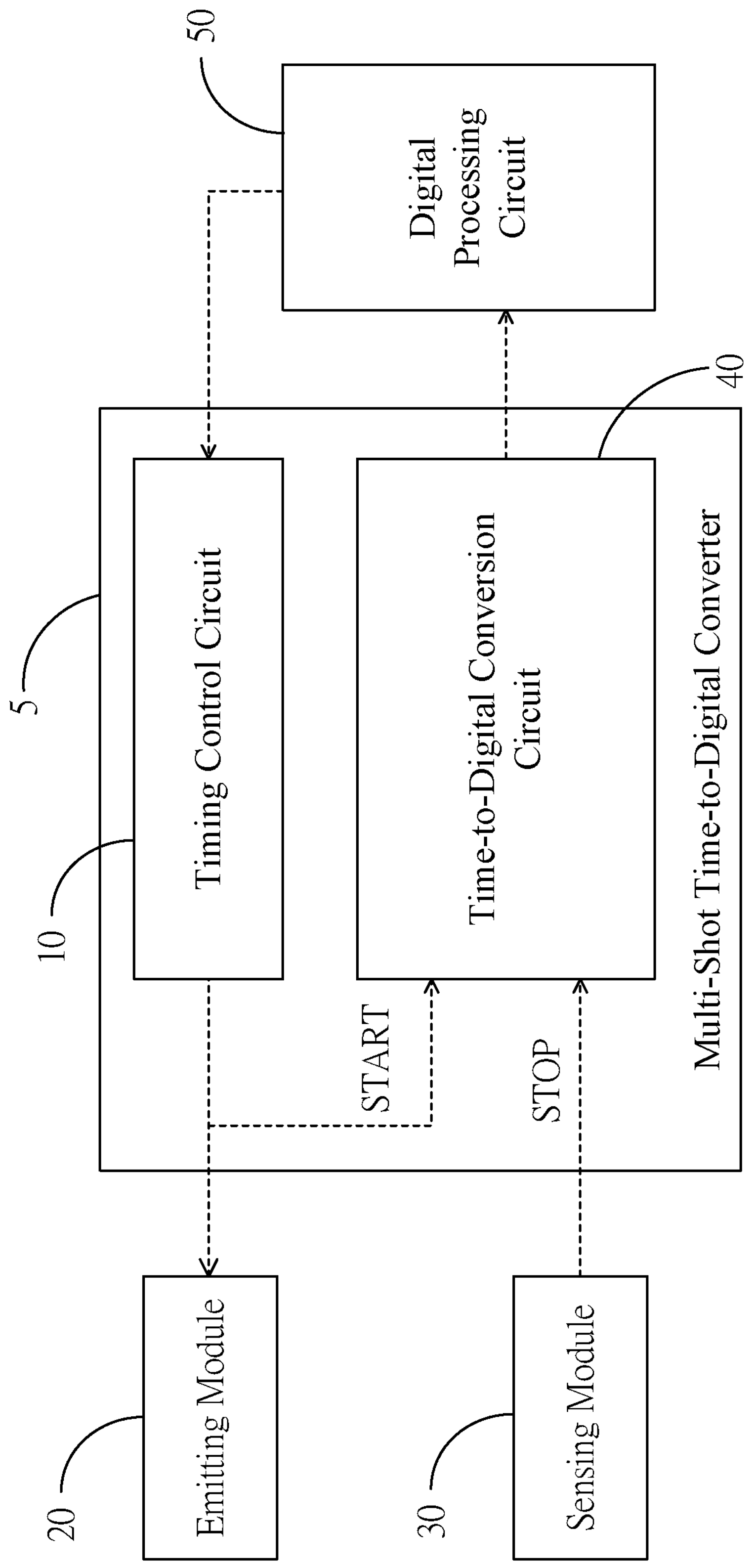
FIG. 1 is a block diagram of a time-measurement device according to an embodiment of the present invention.

Refer to FIG. 1, which is a block diagram of a time-measurement device according to an embodiment of the present invention. The time-measurement device of the present invention includes a multi-shot time-to-digital converter 5 including a timing control circuit 10 and a time-to-digital conversion circuit 40. The time-measurement device further includes an emitting module 20, a sensing module 30, and a digital processing circuit 50. In an embodiment of the present invention, the timing control circuit 10 does not need to be disposed in the multi-shot time-to-digital converter 5. The timing control circuit 10 sends a start signal, START multiple times based on a plurality of time periods. The time periods may be all the same, all different from one another, or a part of them being the same. That means the timing control circuit 10 generates the start signal START at intervals which may be the same or different. The emitting module 20 is coupled to the timing control circuit 10 of the multi-shot time-to-digital converter 5 and sends a measurement signal based on the trigger of the start signal START. That means the emitting module 20 sends the measurement signal at regular or irregular intervals. The measurement signal returns through the reflection of an object. The sensing module 30 senses the returned measurement signal and correspondingly generates a stop signal STOP. Since the timing control circuit 10 drives the emitting module 20 to emit the measurement signal multiple times, the sensing module 30 may sense the returned measurement signal multiple times and correspondingly generate the stop signal STOP multiple times. Since time measurement devices may be used in many fields, and there are various ways to measure time, such as using light, microwave, electric signals, etc, the emitting module 20 and the sensing module 30 may be the module of an optical system or the module of a radio frequency system. The following embodiments are illustrated by the use of light for time measurement. The emitting module 20 is a light emitting module which emits light as a measurement signal and the sensing module 30 is a light sensing module which senses light reflected from an object and generates the stop signal STOP, but not limited.

Still refer to FIG. 1, the time-to-digital conversion circuit 40 is coupled to the timing control circuit 10 and the sensing module 30. When the timing control circuit 10 sends the start signal START to trigger the emitting module 20, it also correspondingly sends the start signal START to the time-to-digital conversion circuit 40. Once the sensing module 30 senses the returned measurement signal, it generates the stop signal STOP to the time-to-digital conversion circuit 40.

Figure 2:
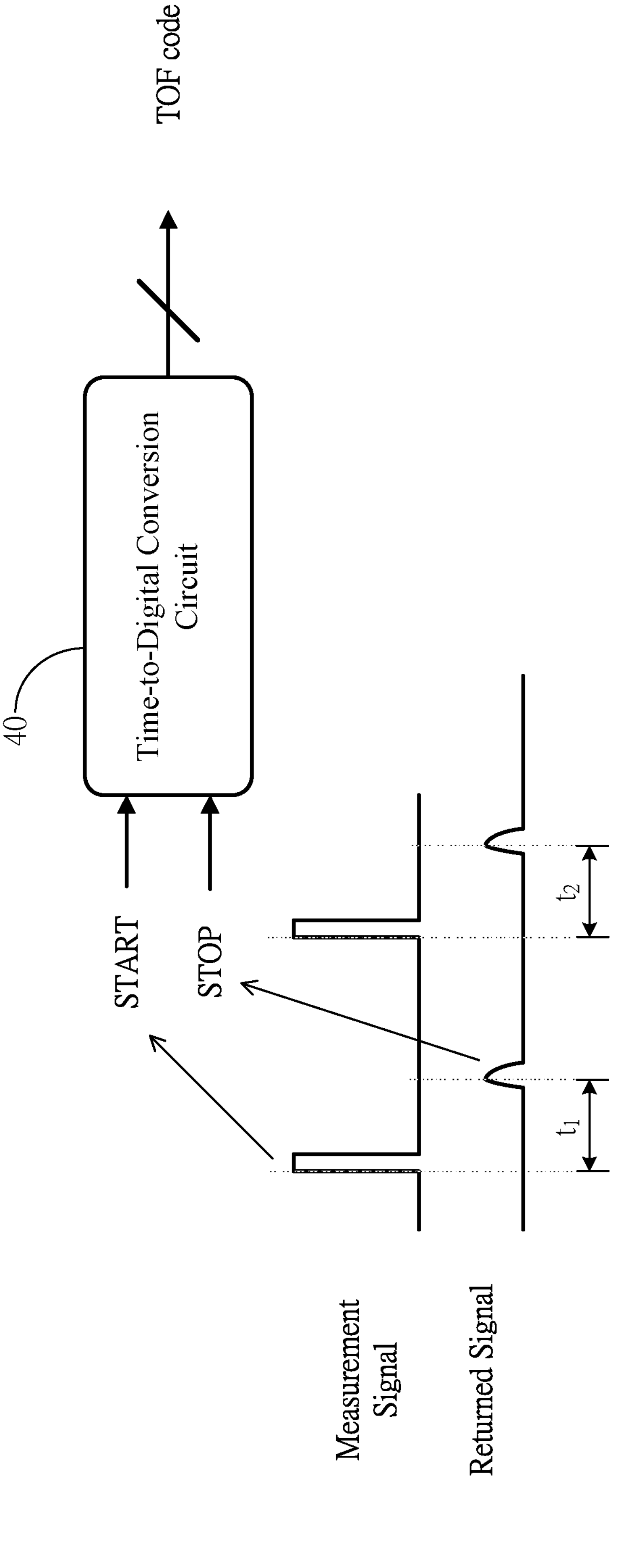
FIG. 2 is a schematic diagram showing operation of a multi-shot time-to-digital converter according to an embodiment of the present invention.

As shown in FIG. 2, the time-to-digital conversion circuit 40 receives the start signal START and the corresponding stop signal STOP in a first measurement period, and a time interval t1 between the start signal START and the stop signal STOP may be measured based on the time stamps of the two signals. Thus, the distance between the object to be measured and the time-measurement device may be obtained based on the time interval t1, also known as the time of flight (TOF). The time-to-digital conversion circuit 40 generates a time-to-digital code which represents the TOF, also called TOF code. Still refer to FIG. 2, in a second measurement period, the time-to-digital conversion circuit 40 measures a time interval t2 between a start signal START and a stop signal STOP based on the time stamps of the second start pulse and the second stop pulse and generates a corresponding time-to-digital code. Thereby the time-to-digital conversion circuit 40 generates a plurality of time-to-digital codes in a plurality of the measurement periods. The operation of the time-to-digital conversion circuit 40 is described in detail below. Back to FIG. 1, the digital processing circuit 50 is coupled to the time-to-digital conversion circuit 40 and receives the time-to-digital codes to accumulate a histogram and perform digital processing including statistical computing, weighted calculation, etc., but not limited to, to obtain an accurate time value.

Figure 3:
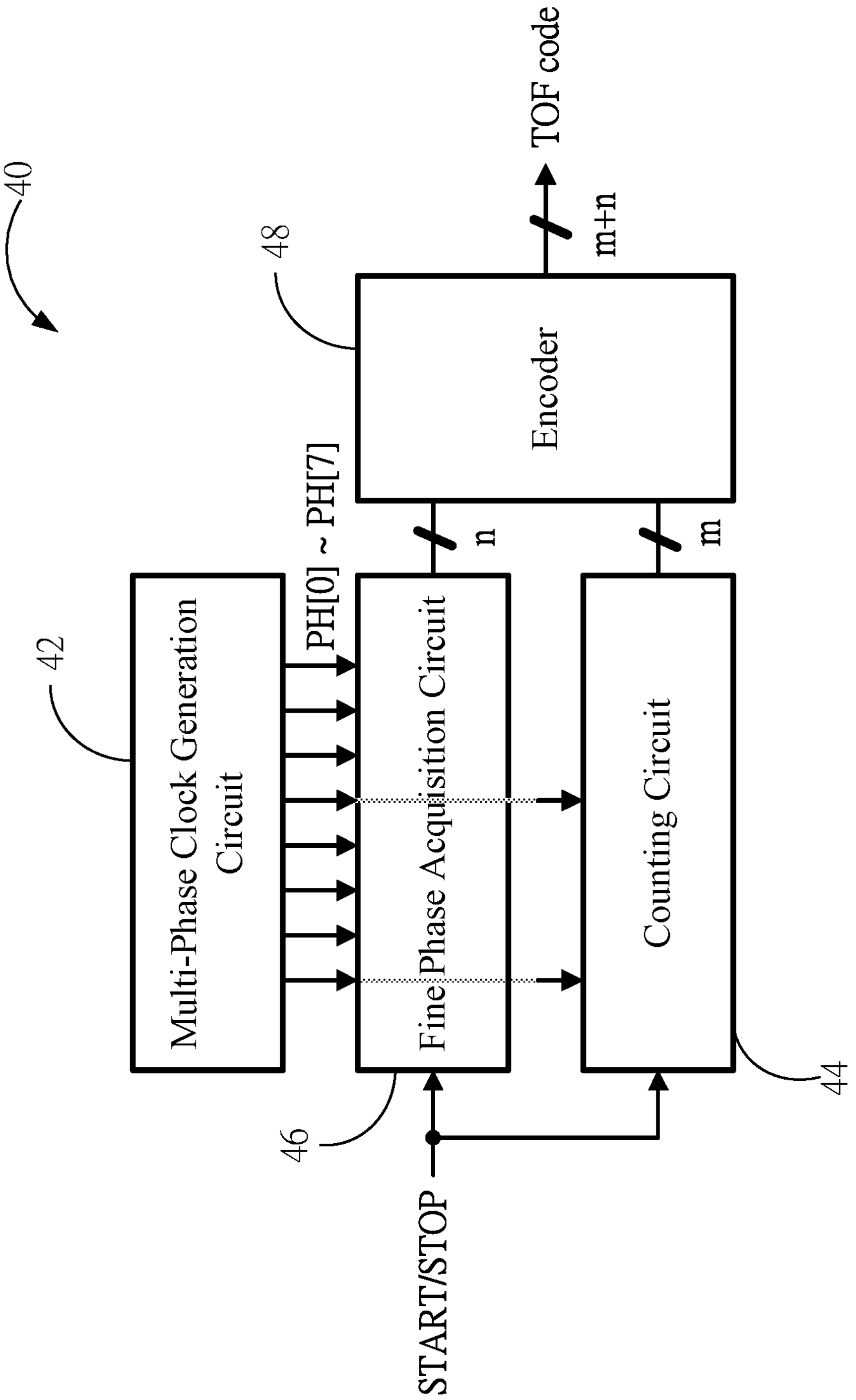
FIG. 3 is a block diagram of a time-to-digital conversion circuit according to an embodiment of the present invention.
Figure 4:
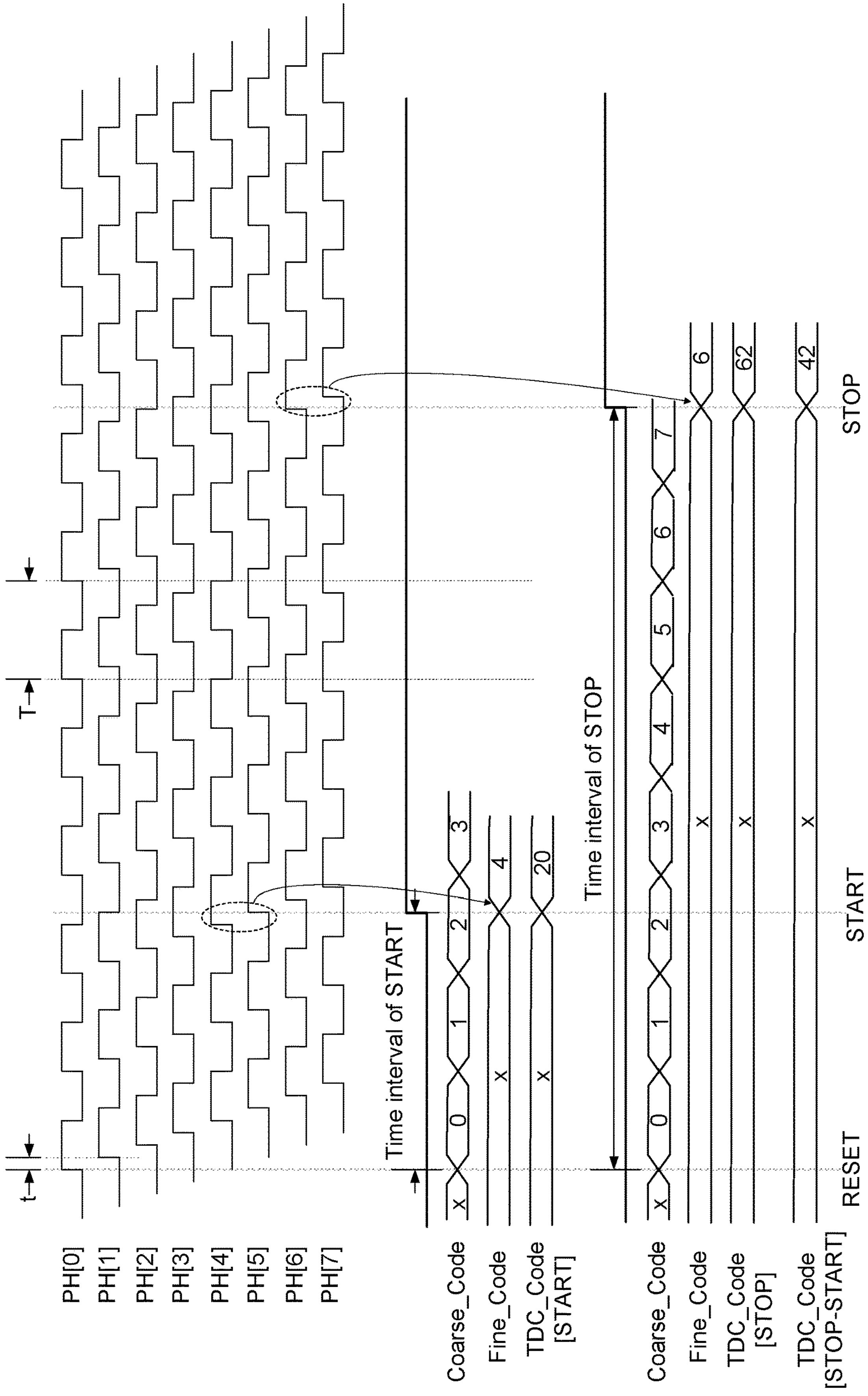
FIG. 4 is a schematic diagram showing time-to-digital conversion of the multi-shot time-to-digital converter in a first measurement period according to an embodiment of the present invention.

Refer to FIG. 3, which is a block diagram of a time-to-digital conversion circuit according to an embodiment of the present invention. The time-to-digital conversion circuit 40 includes a multi-phase clock generation circuit 42, a time-to-digital conversion module, and an encoder 48. The time-to-digital conversion module includes a counting circuit 44 and a fine phase acquisition circuit 46. The multi-phase clock generation circuit 42 generates a plurality of clock signals PH[0]-PH[7], each of the clock signals has a clock period T (as shown in FIG. 4). There is a time delay t between the two successive clock signals of PH[0]-PH[7] and the time delay t is the fine phase time. In an embodiment of the present invention, the multi-phase clock generation circuit 42 may generate 8 clock signals, PH[0] to PH[7] and the time delay t is T/8. This is one of embodiments of the present invention, but not limited thereto. In an embodiment of the present invention, the multi-phase clock generation circuit 42 may include a phase-locked loop (PLL) circuit, a ring oscillator, and a delay locked loop (DLL) circuit for generating the clock signals PH[0]-PH[7].

Still refer to FIG. 3, the time-to-digital conversion module includes the counting circuit 44 and the fine phase acquisition circuit 46 and receives the start signal START and the corresponding stop signal STOP. The time-to-digital conversion module measures the time stamps of the start signal START and the stop signal STOP based on the clock signals PH[0]-PH[7] for measuring the time interval between the start signal START and the stop signal STOP and providing a plurality of time-codes. The counting circuit 44 receives the start signal START and the stop signal STOP, and is coupled to the multi-phase clock generation circuit 42 for receiving at least one of the clock signals PH[0]-PH[7], such as the clock signal PH[0]. In the measurement period, the counting circuit 44 counts the time stamp of the start signal START and the stop signal STOP based on the clock signal PH[0] to generate a coarse start time-code and a coarse stop time-code.

In an embodiment of the present invention, the timing control circuit 10 sends a reset signal RESET (as shown in FIG. 4) to the time-to-digital conversion circuit 40 for resetting the counting circuit 44 before sending the start signal START. As shown in FIG. 4, the counting circuit 44 starts to count based on the leading edge of the clock signal PH[0] after the reset signal RESET is received, adds one to the counting value while receiving the leading edge of the clock signal PH[0], and outputs the counting value once the time stamp of the start signal START is received to generate the coarse start time-code. In this embodiment, the counting value of the counting circuit 44 is 2 while receiving the time stamp of the start signal START. Similarly, the counting circuit 44 outputs a counting value to generate the coarse stop time-code while receiving the time stamp of the stop signal STOP. In this embodiment, the counting value output is 7.

Back to FIG. 3, the fine phase acquisition circuit 46 receives the start signal START and the stop signal STOP, and is coupled to the multi-phase clock generation circuit 42 for receiving the clock signals PH[0]-PH[7]. In the measurement period, the fine phase acquisition circuit 46 acquires the fine phase time of receiving the start signal START and the stop signal STOP based on the clock signals PH[0]-PH[7] to generate a fine start time-code and a fine stop time-code. In an embodiment according to the present invention, the fine phase acquisition circuit 46 acquires fine phase time of receiving the start signal START and the stop signal STOP based on the leading edges of the clock signals PH[0]-PH[7]. As shown in FIG. 4, the fine phase acquisition circuit 46 acquires the time stamp of the start signal START at a time between the leading edge of the clock signal PH[4] and the leading edge of the clock signal PH[5]. The fine phase acquisition circuit 46 acquires the fine phase time of the start signal START at the clock signal PH[4] and generates the fine start time code of 4, since the clock signal PH[4] is delayed by 4 time delays t with respect to the clock signal PH[0]. Similarly, in this embodiment, the fine phase acquisition circuit 46 acquires the time stamp of the stop signal STOP at a time between the leading edge of the clock signal PH[6] and the leading edge of the clock signal PH[7]. The fine phase acquisition circuit 46 acquires the fine phase time of the stop signal STOP at the clock signal PH[6] and generates the fine stop time code of 6, since the clock signal PH[6] is delayed by 6 time delays t with respect to the clock signal PH[0].

Still refer to FIG. 3, the encoder 48 is coupled to the counting circuit 44 and the fine phase acquisition circuit 46 for receiving the coarse start time-code, the coarse stop time-code, the fine start time-code, and the fine stop time-code. Then the encoder 48 generates a start time-code based on the coarse start time-code and the fine start time-code. The coarse start time-code is a most significant bit (MSB) code of the start time-code, and the fine start time-code is a least significant bit (LSB) code of the start time-code. The fine phase time t represents the least significant bit of the fine phase acquisition circuit 46. Similarly, the encoder 48 generates a stop time-code based on the coarse stop time-code and the fine stop time-code. The coarse stop time-code is the most significant bit (MSB) code of the stop time-code, and the fine stop time-code is the least significant bit (LSB) code of the stop time-code. The encoder 48 generates the time-to-digital code based on the stop time-code and the start time-code. The counting circuit 44 counts one time representing a clock period T which is equivalent to N time delays t (i.e., N fine phase times). In this embodiment, a clock period T is equivalent to 8-time delays t. Thus, the coarse start time-code of 2 is equivalent to 16 time delays t. Since the fine start time-code is 4, the start time-code of 20 is obtained. Similarly, the coarse stop time-code in this embodiment is 7 which is equal to 56-time delays t, and the fine stop time-code is 6. Thus, the stop time-code of 62 is obtained. The difference between the stop time-code and the start time-code is the time-to-digital code. In this embodiment, the time-to-digital code is 42 which represents the time interval being equal to 42 fine phase times t. In the above embodiment, the real time interval between the start signal START and the reset signal RESET is set as 20.9*t, and the real time interval between the stop signal STOP and the reset signal RESET is set as 62.1*t. Thus, the actual time interval between the start signal START and the stop signal STOP is 41.2*t. This means that quantization error of the time-to-digital code is 0.8*t.

Figure 5:
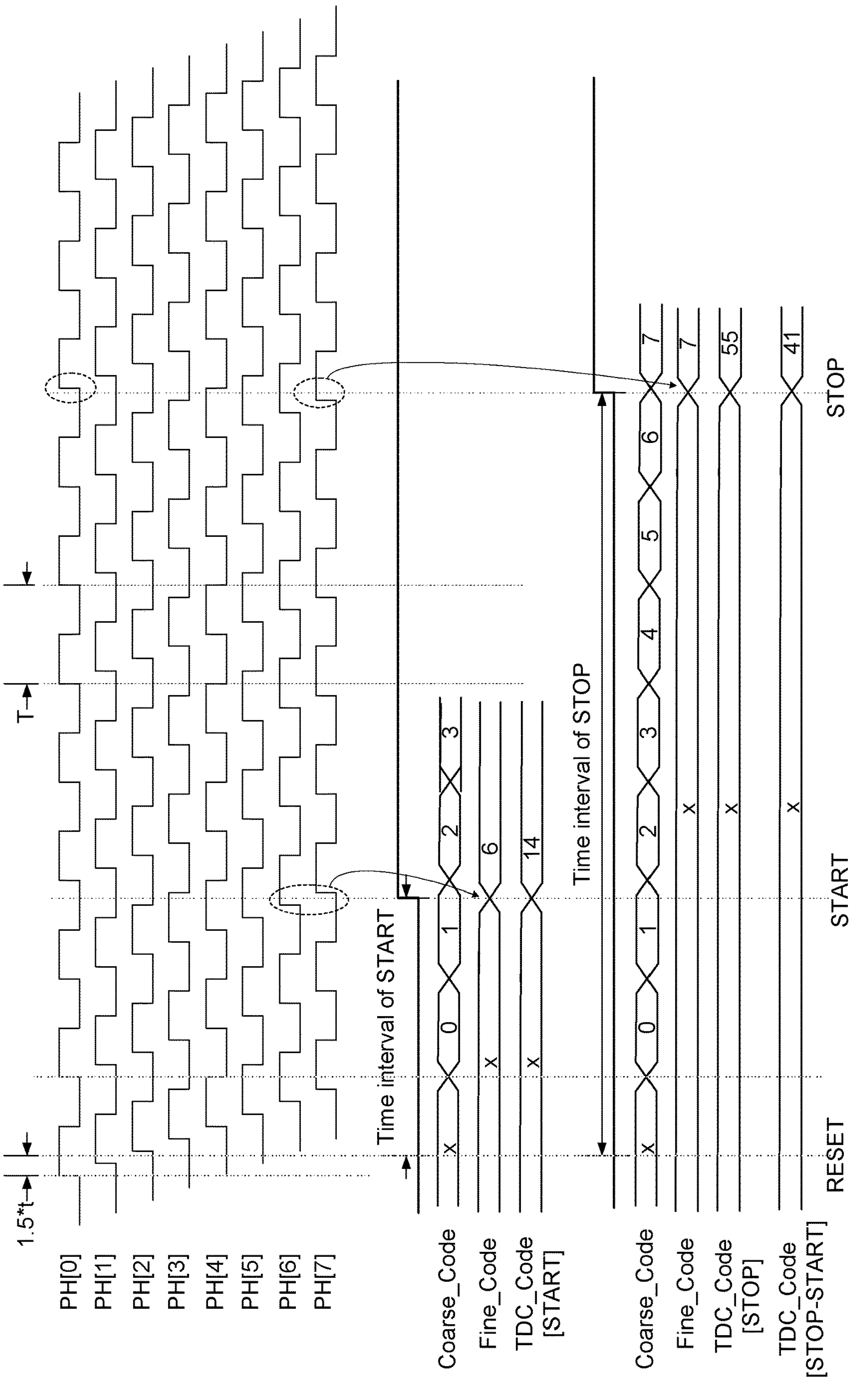
FIG. 5 is a schematic diagram showing time-to-digital conversion of the multi-shot time-to-digital converter in a second measurement period according to an embodiment of the present invention.

Refer to FIG. 5, which is a schematic diagram showing time-to-digital conversion of the multi-shot time-to-digital converter in a second measurement period according to an embodiment of the present invention. The timing control circuit 10 sends the start signal START multiple times based on a plurality of time periods. The time periods may be regular or irregular. The ratio of the time period to the clock period T of the clock signals PH[0]-PH[7] is a non-integer multiple, so that all signals will roll at different fine phase times between the two successive measurement periods. This embodiment is illustrated by a rolling of 1.5*t compared to the embodiment in FIG. 4. When the object does not move, the distance between the time-measurement device and the object remains unchanged so that the time interval should stay unchanged. In the embodiment shown in FIG. 5, after the timing control circuit 10 sends the first start signal START, a second start signal START is sent at a period of time. As mentioned above, at the same time interval, the timing control circuit 10 sends a reset signal RESET to the counting circuit 44 first for resetting the counting circuit 44 before sending the second start signal START. Since the time period between the first start signal START and the second start signal START is not an integer multiple of the clock period T, the fine phase time of the second start signal START will be different from the fine phase time of the first start signal START, and the fine phase time of the second stop signal STOP will be different from the fine phase time of the first stop signal STOP, and so is the reset signal RESET.

As shown in FIG. 5, the coarse start time-code of the second start signal START is 1. The fine phase acquisition circuit 46 acquires the time stamp of the second start signal START at an interval between the leading edge of the clock signal PH[6] and PH[7], and then generates a fine start time-code of 6. Thus, the second start time-code of 14 may be obtained. The coarse stop time-code of the second stop signal STOP is 6. The fine phase acquisition circuit 46 acquires the fine phase time of the second stop signal STOP at the clock signal PH[7], and then generates a fine stop time-code of 7. Thus, the second stop time-code of 55 may be obtained. The difference between the second stop time-code and the second start time-code, i.e., the time-to-digital code of the second measurement period, will be 41, which is different from the measured time-to-digital code of the first measurement period which is 42. The resolution of time-to-digital code of the first measurement period and the second measurement period is the fine phase time t. Since the actual time interval between the start signal START and the stop signal STOP is 41.2*t, the quantization error of the time-to-digital code measured in the second measurement period is −0.2*t.

Back to FIG. 1, the time-to-digital code of the first measurement period and the time-to-digital code of the second measurement period are provided to the digital processing circuit 50 for further digital processing such as average calculation. For example, an average value of the time-to-digital code of the first measurement period and the time-to-digital code of the second measurement period is 41.5 (the average of 41 and 42). Thus, the time interval obtained by the two measurement periods is 41.5 fine phase times t, which is an error of 0.3*t with respect to the actual time interval (41.2*t). Thereby the resolution of the time-to-digital converter (TDC) is effectively improved from the original one fine phase time t to less than one fine phase time t.

Figure 6:
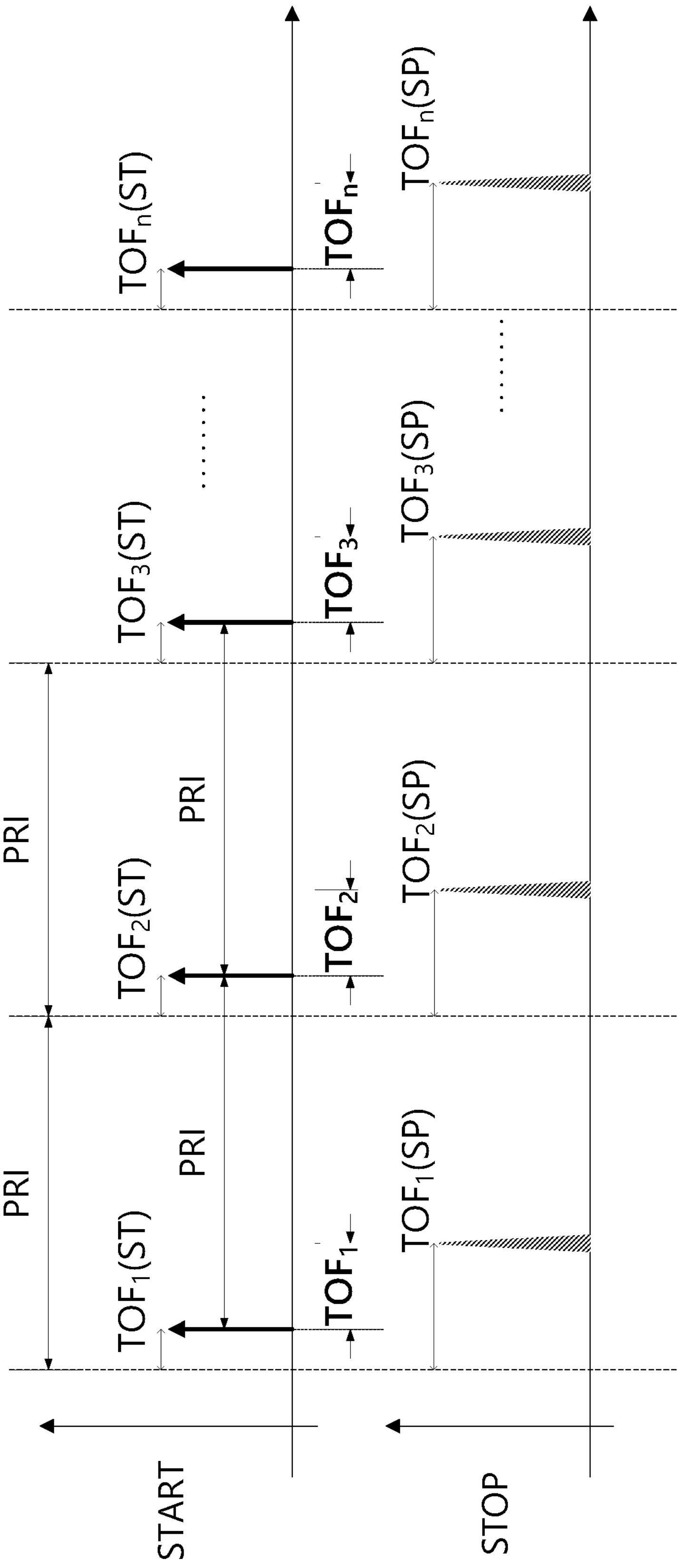
FIG. 6 is a schematic diagram showing the operation of the multi-shot time-to-digital converter according to an embodiment of the present invention.

Refer to FIG. 6, which is a schematic diagram showing the operation of the multi-shot time-to-digital converter according to an embodiment of the present invention. $TOF_1$(ST) represents the start time-code of the start signal START in the first measurement period, $TOF_n$(ST) represents the start time-code of the start signal START in the N-th measurement period. $TOF_1$(SP) represents the stop time-code of the stop signal STOP in the first measurement period, $TOF_n$(SP) represents the stop time-code of the stop signal STOP in the N-th measurement period. $TOF_1$ represents the time-to-digital code measured in the first measurement period and is the difference value between the $TOF_1$(SP) and the $TOF_1$(ST). $TOF_n$ represents the time-to-digital code measured in the N-th measurement period and is the difference value between the $TOF_n$(SP) and $TOF_n$(ST). As shown in figure, the multi-shot time-to-digital converter sends the start signal START multiple times based on a repetitive interval PRI. Since the repetitive interval PRI is not integer multiple of the clock period T of the clock signals, the time stamp of these start signals START and the corresponding stop signals STOP received by the multi-shot time-to-digital converter will roll across leading edges of different clock signals. That means they are rolling across different fine phase times. Thereby the multi-shot time-to-digital converter may obtain time-to-digital codes at different fine phase times, instead of getting the time-to-digital codes at the same fine phase time. Therefore, the problem of nonlinearity may be improved. Moreover, the time-to-digital codes obtained are sent to the digital processing circuit 50 for further digital processing including centroid calculation for histograms, weighted mean, etc. but not limited. Thus, resolution of the time-to-digital conversion and the problem of quantization error are both improved.

An illustration of determining rolling interval of the start signals START and the stop signals STOP is described in the following. The rolling interval R is the remainder of the repetitive interval PRI divided by the clock period T of the clock signal, and the clock period T is the fine phase time t multiplied by the number of clock signals (i.e., t*N). That means the relationship of PRI, T, and R satisfies the following equation: PRI=K*T+R, where PRI, T, and K may be positive numbers and T is not zero.

Figure 7:
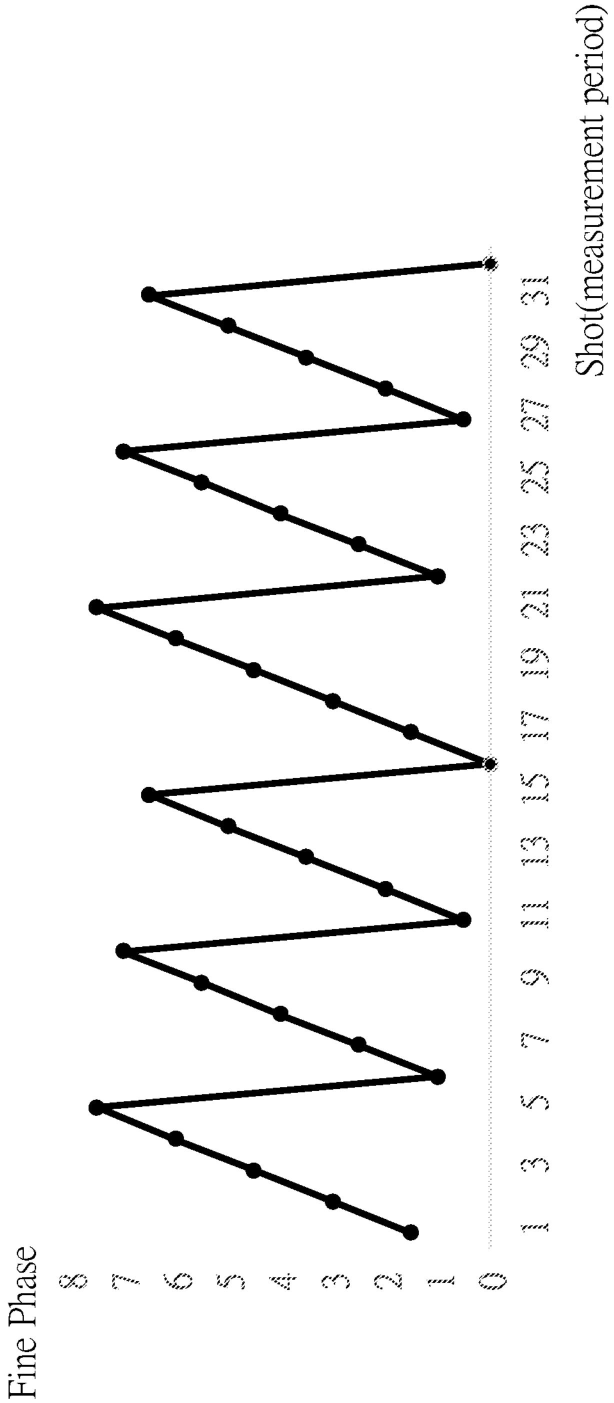
FIG. 7 is a schematic diagram illustrating the multi-shot time-to-digital converter having the time-codes rolling across different fine phase times in the successive measurement periods according to an embodiment of the present invention.

In an embodiment of the present invention, the multi-phase clock generation circuit 42 is designed to generate 8 clock signals at an oscillation frequency of 706.25 MHz, so that the fine phase time t is 1/(706.25 M*8), about 177 ps. With a repetitive interval PRI of 990 ns, the rolling interval, i.e., the remainder of repetitive interval PRI divided by clock period T of clock signal will be 1.5. Here, the unit of the rolling interval is defined as the fine phase time, and a rolling interval value of 1.5 means that the start signal START and the stop signal STOP will roll in steps of 1.5 fine phase time t in two successive measurement periods, as shown in FIG. 7. When the signal falls on a position of 1.5 t in the first measurement period, i.e., in the middle of the leading edges of the clock signal PH[1] and the clock signal PH[2], then the signal will fall on a position of 3 t in the second measurement period, on the leading edge of clock signal PH[3], and the signal will fall on a position of 4.5 t in the third measurement period, in the middle of the leading edges of the clock signal PH[4] and the clock signal PH[5], and continuously rolling in steps of 1.5 t. It may be noticed that after 16 measurement periods, at the 17th measurement period, the signal returns to the position at the first measurement period and so on. During the 16 measurement periods, the start signal START and stop signal STOP may be regarded as rolling in 0.5 t steps, even though the rolling interval between two successive measurement periods is 1.5 t, but the step is 0.5 t from the view of overall 16 measurement periods. Thus, each fine phase time may be acquired two times eventually, the problem of nonlinearity may be effectively improved. Moreover, the time-to-digital codes obtained in the 16 measurement periods may be further processed, e.g., average calculation, to get a resolution of 0.5 t, which effectively improves the quantization error.

The present invention meets requirements for patentability including novelty, non-obviousness and usefulness.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A multi-shot time-to-digital converter comprising:

a time-to-digital conversion circuit; and a timing control circuit coupled to the time-to-digital conversion circuit and sending a start signal to the time-to-digital conversion circuit multiple times for measuring a time interval corresponding to the start signal;

wherein the time-to-digital conversion circuit obtains a fine phase time based on a plurality of clock signals to measure the time interval and provides a plurality of time-to-digital codes for digital processing, the phases of the clock signals are different.

2. The multi-shot time-to-digital converter as claimed in claim 1, wherein the timing control circuit sends the start signal multiple times based on a plurality of time periods, the time periods are all the same, or different from one another, or a part of the time periods are the same.

3. The multi-shot time-to-digital converter as claimed in claim 2, wherein the clock signals have a clock period, a time delay between the two successive clock signals is the fine phase time, a ratio of at least one of the time periods to the clock period is non-integer multiple, and the time delay is determined by the clock period and the number of the clock signals.

4. The multi-shot time-to-digital converter as claimed in claim 1, wherein the time-to-digital conversion circuit includes:

a multi-phase clock generation circuit, generating the clock signals, each of the clock signals having a clock period, and a time delay between the two successive clock signals being the fine phase time; and a time-to-digital conversion module, receiving the start signals and a plurality of stop signals corresponding to the start signals, measuring time stamps of the start signals and the stop signals based on the clock signals, measuring time intervals between the start signals and the corresponding stop signals, and providing a plurality of time codes.

5. The multi-shot time-to-digital converter as claimed in claim 4, wherein the time-to-digital conversion module includes:

a counting circuit, coupled to the multi-phase clock generation circuit, counting the time stamps of the start signals and the stop signals based on at least one of the clock signals in a measurement period, and generating a coarse start time-code and a coarse stop time-code of the time-codes; and a fine phase acquisition circuit, coupled to the multi-phase clock generation circuit, acquiring the time stamps of the start signals and the stop signals based on the clock signals in the measurement period, and generating a fine start time-code and a fine stop time-code of the time-codes;

wherein an encoder is coupled to the counting circuit and the fine phase acquisition circuit, generates a start time-code based on the coarse start time-code and the fine start time-code, generates a stop time-code based on the coarse stop time-code and the fine stop time-code in the measurement period, and further generates the time-to-digital code based on the start time-code and the stop time-code so that the time-to-digital codes are generated in a plurality of measurement periods.

6. A time-measurement device comprising:

an emitting module, sending a measurement signal based on a start signal;

a sensing module, sensing the returned measurement signal and correspondingly generating a stop signal; and a multi-shot time-to-digital converter, sending the start signal multiple times, coupled to the emitting module and the sensing module, receiving the stop signal, obtaining a fine phase time based on a plurality of clock signals to measure a time interval corresponding to the start signal and the stop signal, and providing a plurality of time-to-digital codes for digital processing, and the phases of the clock signals are different.

7. The time-measurement device as claimed in claim 6, further including a digital processing circuit, coupled to the multi-shot time-to-digital converter and receiving the time-to-digital codes to perform digital processing for generating a time value.

8. The time-measurement device as claimed in claim 6, wherein the multi-shot time-to-digital converter further includes a timing control circuit sending the start signal multiple times in a plurality of time periods, time intervals of the time periods are all the same, or different from one another, or a part of the time intervals are the same.

9. The time-measurement device as claimed in claim 8, wherein the clock signals have a clock period, a time delay between the two successive clock signals is the fine phase time, a ratio of at least one of the time periods to the clock period is non-integer multiple, and the time delay is determined by the clock period and the number of the clock signals.

10. The time-measurement device as claimed in claim 9, wherein time stamps of the start signals and the corresponding stop signals in the measurement periods are rolling across the fine phase times.

11. The time-measurement device as claimed in claim 6, wherein the multi-shot time-to-digital converter includes:

a multi-phase clock generation circuit, generating the clock signals having a clock period, and a time delay between the two successive clock signals being the fine phase time; and a time-to-digital conversion module, receiving the start signals and the corresponding stop signals, measuring the time stamps of the start signals and the stop signals based on the clock signals for measuring time intervals between the start signals and the corresponding stop signals and providing a plurality of time-codes.

12. The time-measurement device as claimed in claim 11, wherein the time-to-digital conversion module includes:

a counting circuit, coupled to the multi-phase clock generation circuit, counting the time stamps of the start signal and the stop signal based on at least one of the clock signals in a measurement period, and generating a coarse start time-code and a coarse stop time-code of the time-codes; and a fine phase acquisition circuit, coupled to the multi-phase clock generation circuit, acquiring the time stamps of the start signal and the stop signal based on the clock signals in the measurement period, and generating a fine start time-code and a fine stop time-code of the time-codes;

wherein an encoder is coupled to the counting circuit and the fine phase acquisition circuit, generates a start time-code based on the coarse start time-code and the fine start time-code, generates a stop time-code based on the coarse stop time-code and the fine stop time-code in the measurement period, and further generates the time-to-digital code based on the start time-code and the stop time-code so that the time-to-digital codes are generated in a plurality of the measurement periods.

* * * * *